(12) United States Patent
Potnis et al.

(10) Patent No.: US 11,282,540 B2
(45) Date of Patent: Mar. 22, 2022

(54) HOLOGRAPHIC OPTICAL ELEMENTS HAVING LIGHTGUIDES WITH MULTIPLE HOLOGRAM RECORDINGS AND METHODS OF MAKING THE SAME

(71) Applicant: GOOGLE LLC, Mountain View, CA (US)

(72) Inventors: Shreyas Potnis, Kitchener (CA); Jackie Lynn Mills, Kitchener (CA); Timothy Paul Bodiya, Toronto (CA)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 16/738,230

(22) Filed: Jan. 9, 2020

(65) Prior Publication Data

US 2020/0227085 A1 Jul. 16, 2020

Related U.S. Application Data

(60) Provisional application No. 62/943,381, filed on Dec. 4, 2019, provisional application No. 62/791,514, filed on Jan. 11, 2019.

(51) Int. Cl.
*G03H 1/02* (2006.01)
*G11B 7/0065* (2006.01)
*G02B 5/32* (2006.01)
*G03H 1/26* (2006.01)
*G03H 1/04* (2006.01)

(52) U.S. Cl.
CPC ............. *G11B 7/0065* (2013.01); *G02B 5/32* (2013.01); *G03H 1/0248* (2013.01); *G03H 1/0402* (2013.01); *G03H 1/265* (2013.01); *G03H 2001/0439* (2013.01); *G03H 2260/12* (2013.01)

(58) Field of Classification Search
None
See application file for complete search history.

(56) References Cited

U.S. PATENT DOCUMENTS

2018/0329127 A1* 11/2018 Facke ................. G03H 1/0404
2020/0192285 A1* 6/2020 Kim ................... G02B 27/0093

* cited by examiner

*Primary Examiner* — Jennifer D. Carruth (57) ABSTRACT

There are provided holographic optical elements (HOEs) and methods of making the same. An example of such methods includes recording a first hologram in a contiguous holographic recording medium of the HOE. The first hologram may receive a beam of light and direct at least a portion of the beam into a light guide to form an incoupled beam. The method also includes recording a second hologram in the contiguous holographic recording medium. The second hologram may receive at least a portion of the incoupled beam and direct the portion of the incoupled beam out of the light guide to form an outcoupled beam. In addition, the method includes affixing the holographic recording medium to the light guide.

19 Claims, 8 Drawing Sheets

HOLOGRAPHIC OPTICAL ELEMENTS HAVING LIGHTGUIDES WITH MULTIPLE HOLOGRAM RECORDINGS AND METHODS OF MAKING THE SAME

CROSS-REFERENCE TO RELATED APPLICATIONS

This application claims the benefit of the following applications, each of which is incorporated by reference herein in their entirety:

U.S. Provisional Patent Application No. 62/791,514, filed Jan. 11, 2019, titled "Systems, Devices, and Methods for Light Guide Based Wearable Heads-Up Displays".

U.S. Provisional Patent Application No. 62/943,381, filed Dec. 4, 2019, titled "Optical Elements and Methods of Making the Same".

U.S. Provisional Patent Application No. 62/946,705, filed Dec. 11, 2019, titled "Optical Elements for Displays".

FIELD

The present specification relates to optical elements and methods of making the same, and in particular to holographic optical elements and methods of making the same.

BACKGROUND

Optical systems may use optical elements to manipulate light. Such optical elements may reflect, refract, or otherwise change the light. Holograms are an example of such optical elements. Holograms may be made by creating patterns of variations in the refractive index of an optical medium. Refractive index may also be referred to as "the index of refraction". Making holograms by creating the variations in the refractive index may also be described as writing or recording the hologram in the medium.

SUMMARY

According to an implementation of the present specification there is provided a method of making a holographic optical element (HOE), the method comprising: recording a first hologram in a contiguous holographic recording medium of the HOE, the first hologram to receive a beam of light and to direct at least a portion of the beam into a light guide to form an incoupled beam; recording a second hologram in the contiguous holographic recording medium, the second hologram to receive at least a portion of the incoupled beam and to direct the portion of the incoupled beam out of the light guide to form an outcoupled beam; and affixing the holographic recording medium to the light guide.

The method may further comprise: recording a third hologram in the holographic recording medium, the third hologram to receive the incoupled beam and split the incoupled beam into a plurality of offspring beams to be received by the second hologram.

The third hologram may be an exit pupil expander; and the recording the third hologram may comprise forming the exit pupil expander in the holographic recording medium.

The affixing the holographic recording medium to the light guide may comprise, affixing the holographic recording medium on the light guide before the recording the first hologram and the second hologram.

The affixing the holographic recording medium to the light guide may comprise, affixing the holographic recording medium to the light guide after the recording the first hologram and the second hologram.

The affixing the holographic recording medium to the light guide may comprise, affixing the holographic recording medium on an outer surface of the light guide.

The affixing the holographic recording medium to the light guide may comprise, affixing the holographic recording medium to be at least partially inside the light guide.

The method may further comprise: forming an anti-reflective coating between the holographic recording medium and the light guide.

The method may further comprise: forming an anti-reflective coating on the light guide.

The recording the first hologram may comprise recording the first hologram in a first volume of the holographic recording medium; and the recording the second hologram may comprise recording the second hologram in a second volume of the holographic recording medium, the first volume non-overlapping with the second volume.

The recording the first hologram may comprise recording the first hologram in a first volume of the holographic recording medium; and the recording the second hologram may comprise recording the second hologram in a second volume of the holographic recording medium, the first volume being spaced from the second volume in the holographic recording medium.

The recording the first hologram may comprise recording the first hologram as at least one of an angle-multiplexed hologram and a wavelength-multiplexed hologram; and the recording the second hologram may comprise recording the second hologram as at least one of a corresponding angle-multiplexed hologram and a corresponding wavelength-multiplexed hologram.

The holographic recording medium may comprise a photo-polymerizable composition; and the recording the first hologram and the recording the second hologram in the holographic recording medium may comprise recording the first hologram and recording the second hologram in the photo-polymerizable composition.

The photo-polymerizable composition may comprise a photopolymer; and the recording the first hologram and the recording the second hologram in the holographic recording medium may comprise recording the first hologram and recording the second hologram in the photopolymer.

The method may further comprise: after the recording the first hologram and the recording the second hologram in the photo-polymerizable composition, bleaching the photo-polymerizable composition.

The method may further comprise: before the recording the first hologram and the recording the second hologram in the holographic recording medium, placing the holographic recording medium in a surrounding medium having an index of refraction larger than a corresponding index of refraction of the holographic recording medium.

According to another implementation of the present specification there is provided a holographic optical element comprising: a contiguous holographic recording medium comprising: a first hologram recorded in the holographic recording medium, the first hologram to receive a beam of light and to direct at least a portion of the beam into a light guide to form an incoupled beam; and a second hologram recorded in the holographic recording medium, the second hologram to receive at least a portion of the incoupled beam and to direct the portion of the incoupled beam out of the light guide to form an outcoupled beam.

The holographic recording medium may further comprise: a third hologram recorded in the holographic recording medium, the third hologram to receive the incoupled beam and split the incoupled beam into a plurality of offspring beams to be received by the second hologram.

The third hologram may be an exit pupil expander.

The HOE may further comprise the light guide.

The holographic recording medium may be disposed at least partially in the light guide.

The holographic recording medium may be disposed on an outer surface of the light guide.

The HOE may further comprise an anti-reflective coating disposed between the holographic recording medium and the light guide.

The HOE may further comprise an anti-reflective coating disposed on the light guide.

The holographic recording medium may have a refractive index being about the same as a corresponding refractive index of the light guide.

The holographic recording medium may have a first refractive index in a first region of the holographic recording medium and a second refractive index in a second region of the holographic recording medium; the first region is proximal to the light guide, and the first refractive index is about the same as a corresponding refractive index of the light guide; and the second region is distal from the light guide, the second refractive index being different than the first refractive index and the corresponding refractive index of the light guide.

The holographic recording medium may have a gradient refractive index changing from the first refractive index in the first region to the second refractive index in the second region.

The first hologram and the second hologram may be recorded in a first volume and a second volume of the holographic recording medium respectively; and the first volume may be non-overlapping with the second volume.

The first volume may be spaced from the second volume in the holographic recording medium.

At least one of the first hologram and the second hologram may comprise at least one of an angle-multiplexed hologram and a wavelength-multiplexed hologram.

The holographic recording medium may comprise a photo-polymerizable composition.

The photo-polymerizable composition may comprise a photopolymer.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Throughout this specification and the appended claims, the term "carries" and variants such as "carried by" are generally used to refer to a physical coupling between two objects. The physical coupling may be direct physical coupling (i.e. with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, or supported by, with or without any number of intermediary physical objects therebetween.

Displays may use optical elements to guide and manipulate light to form images. These optical elements may comprise multiple optical components that cooperate to achieve the functionality of the optical element. For example, an optical element may comprise an incoupler (IC) to direct light incident upon the optical element towards or into another optical element, such as a light guide, and the like. Moreover, in some examples, an optical element may comprise an outcoupler (OC) to direct light out of the optical element and towards the eye of a user to form an image viewable by the user. Furthermore, in some examples, the optical components may comprise holograms, surface relief gratings (SRGs), and the like. In some examples, optical elements that comprise one or more holograms may be described as holographic optical elements (HOEs).

Optically aligning the various optical components of the optical element may allow the optical components to work together to perform the functions of the optical element. In some example optical elements, the optical components may be made separately and then assembled and optically aligned together to form the optical element. Such optical alignment may demand fine spatial tolerances, which may present a challenge in the process of making the optical element.

Figure 1:
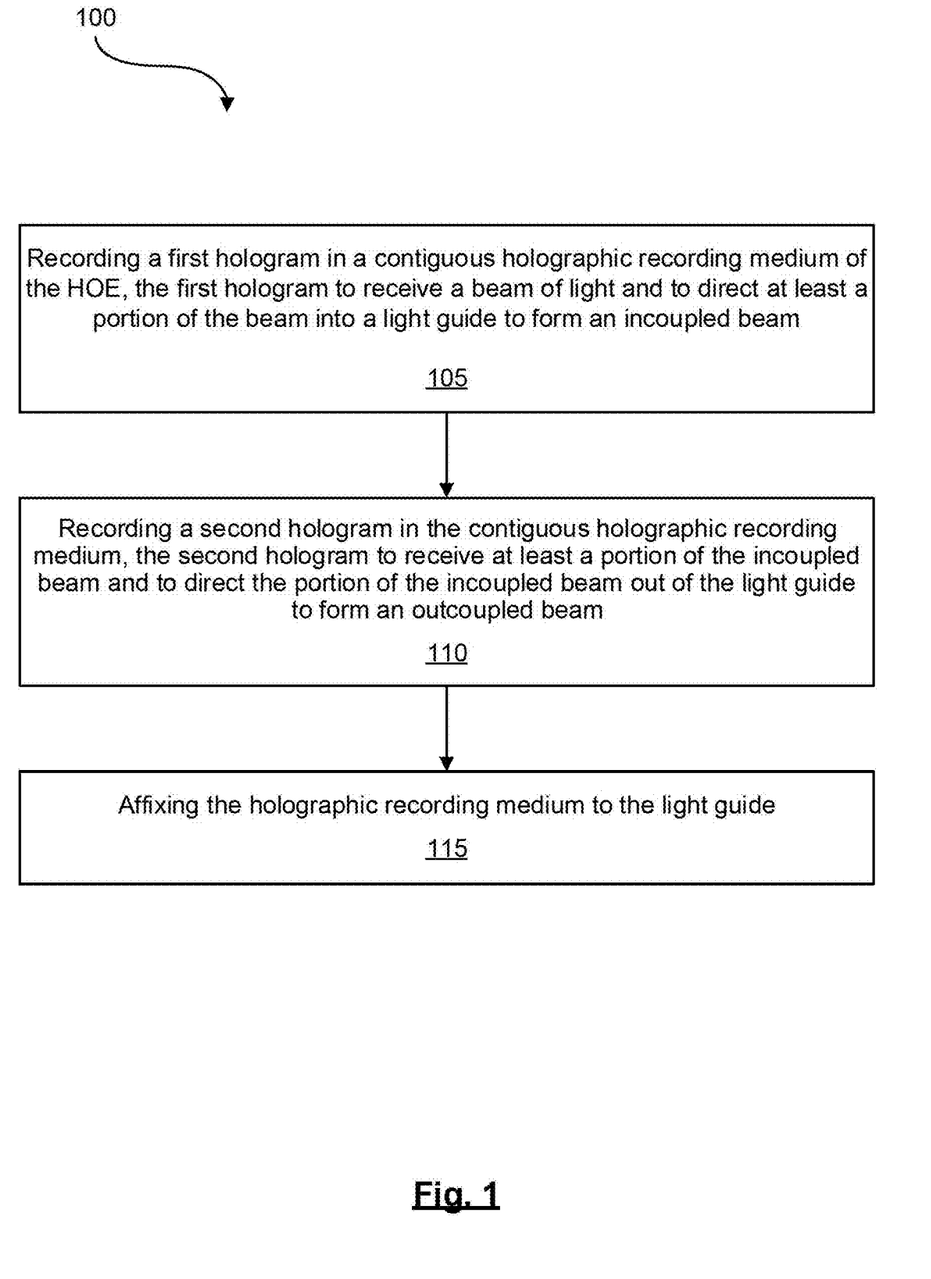
FIG. 1 shows a flowchart of an example method of making a holographic optical element (HOE), in accordance with a non-limiting implementation of the present specification.

FIG. 1 shows a flowchart of an example method 100 of making a HOE. Method 100 may be used to reduce the challenges associated with aligning optical elements by forming the various optical components in one contiguous holographic recording medium. In this description, holographic recording medium may also be referred to as "recording medium" or "medium" in short. Method 100 will be described in relation to an example HOE 200 shown in FIGS. 2 and 3, for illustrative purposes. It is contemplated that method 100 may also be used to make HOEs other than those shown in FIGS. 2 and 3.

Turning now to method 100, at box 105 a first hologram is recorded in a contiguous holographic recording medium of the HOE. The first hologram is to receive a beam of light and to direct at least a portion of the beam into a light guide to form an incoupled beam. In some examples, the first hologram may direct the incoupled beam into the light guide by redirecting the incoupled beam at an angle relative to the light guide that allows the incoupled beam to enter into the light guide. The incoupled beam may then continue to propagate in the light guide due to internal reflections from the sides of the light guide, or due to surface coatings or treatments on the light guide, as examples.

Moreover, in some examples, the recording medium may comprise a photo-polymerizable composition. In such examples, a beam or pattern of light may be used to polymerize some portions of the medium. These polymerized portions may have a different refractive index than the unexposed portions of the medium. The pattern of variations in the refractive index of the medium may then be described as or function as the hologram. Further, in some examples, the photo-polymerizable composition may comprise a photopolymer.

In this description, depending on the context, "photopolymer" may refer to (a) a mixture of polymer precursors and a photo initiator, which mixture is capable of being at least partially photopolymerized into a resulting polymer, (b) the resulting polymer itself, or (c) a mixture of (a) and (b). In some examples, in the context of a blank holographic recording medium, "photopolymer" may refer to (a) or (c). Moreover, in some examples, in the context of a holographic recording medium with holograms recorded therein, "photopolymer" may refer to (b) or (c).

Furthermore, in some examples the polymer precursors may comprise monomers, dimers, oligomers, and the like. In addition, in some examples, the photo initiator may comprise a photo initiator dye, and the like.

At box 110, in turn, a second hologram is recorded in the contiguous holographic recording medium. The second hologram is to receive at least a portion of the incoupled beam, and to direct the portion of the incoupled beam out of the light guide to form an outcoupled beam. In some examples, the second hologram may receive the incoupled beam from the light guide. The second hologram may outcouple the outcoupled beam by directing the outcoupled beam at an angle relative to the light guide that allows the outcoupled beam to be transmitted through and out of a side of the light guide, instead of being reflected back into and continuing to propagate inside the light guide. The second hologram may be recorded similarly to the recording of the first hologram.

In this manner, the first hologram may function as an IC and the second hologram may function as an OC. Since both holograms are recorded in one contiguous holographic recording medium, method 100 obviates the need to spatially align a physically-separate IC and OC with each other in order to optically align the IC and OC to perform the functions of the HOE.

Turing now to box 115, the holographic recording medium is affixed to the light guide. In some examples, the medium may self-adhere to the light guide or may be secured to the light guide using an optical grade adhesive. Moreover, in some examples, the medium may be laminated to the light guide, or may be otherwise affixed to the light guide. It is contemplated that in some examples, the medium may itself act as the light guide, in which case the HOE need not comprise a separate light guide.

In some examples, the holograms may be recorded in the medium, and then the recorded medium may be affixed to the light guide. Moreover, in some examples, the unrecorded medium may be affixed to the light guide, and then the holograms may be recorded in the medium. In some examples, affixing first and then recording may avoid distortion or damage to the holograms caused by the process of affixing the recorded medium to the light guide.

Figure 2:
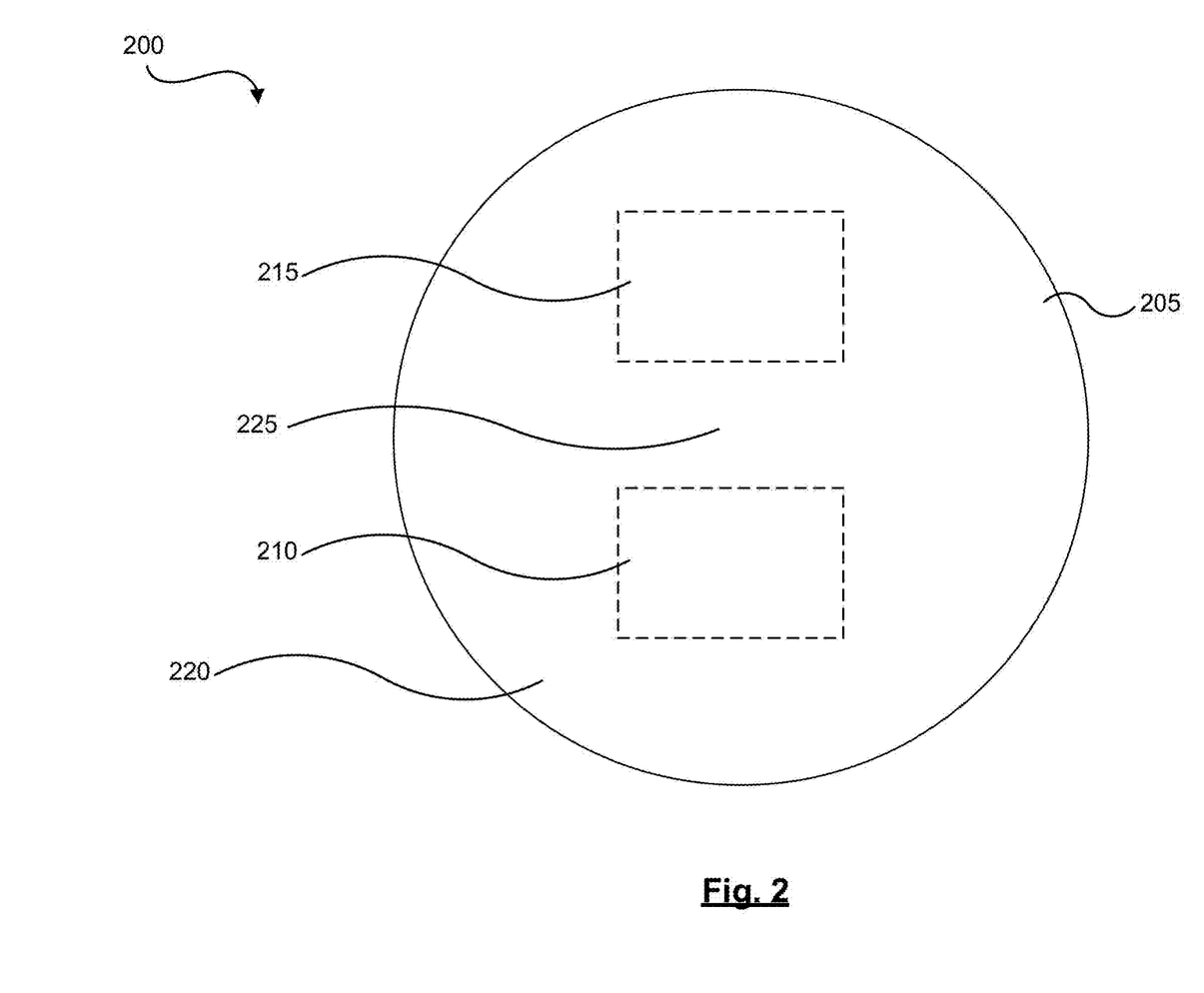
FIG. 2 shows a schematic top plan view of an example HOE, in accordance with a non-limiting implementation of the present specification.

Turning now to FIG. 2, a schematic top plan view is shown of an example HOE 200. HOE 200 comprises a contiguous holographic recording medium 205. A first hologram 210 and a second hologram 215 are recorded in medium 205. The dashed boxes associated with holograms 210 and 215 show a top plan view of the footprint of holograms 210 and 215 in medium 205. Moreover, while FIG. 2 shows medium 205 as having a circular shape and the footprint of holograms 210 and 215 as having rectangular shapes, it is contemplated that in some examples medium 205 and the footprints of holograms 210 and 215 may have shapes other than those shown in FIG. 2.

Figure 3:
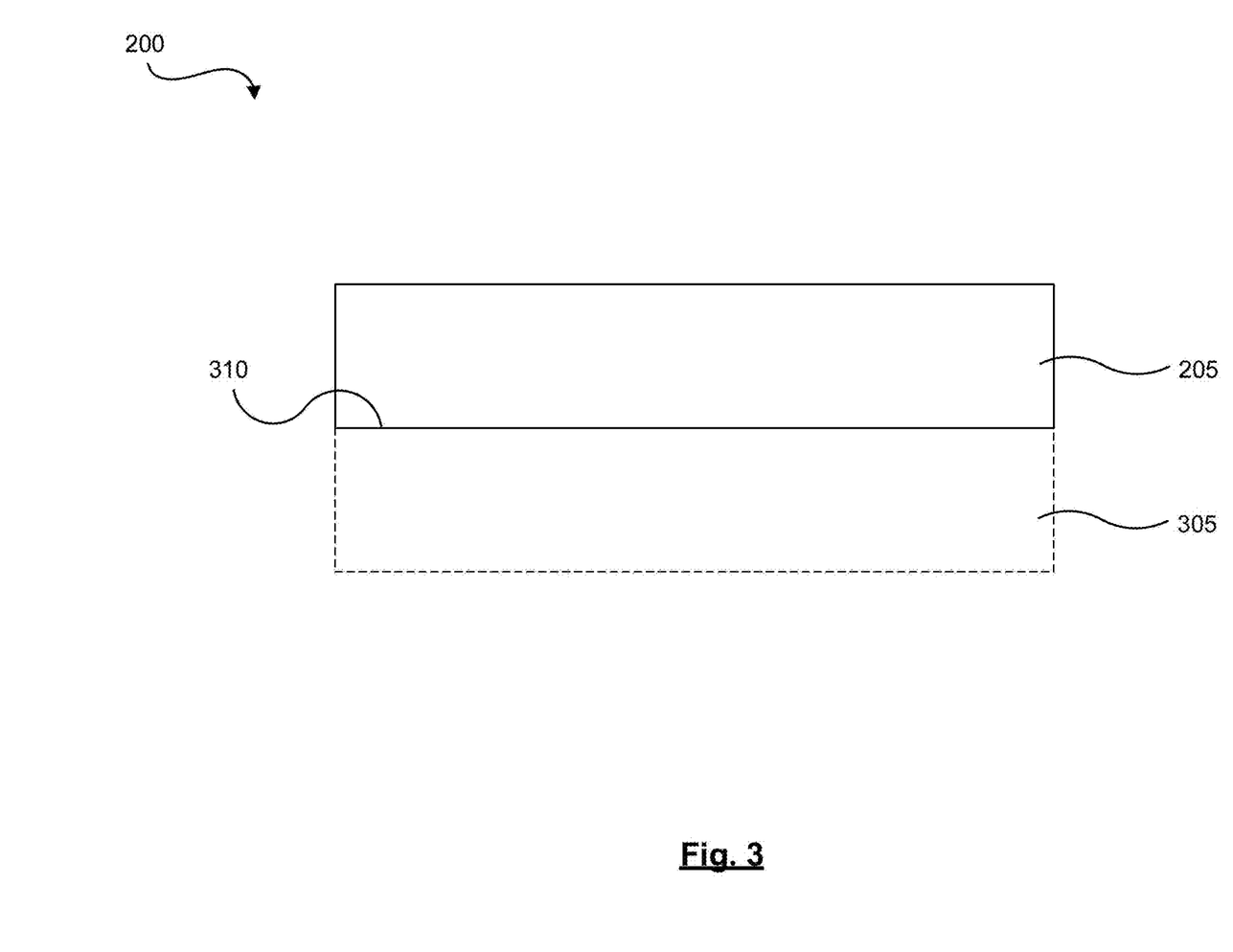
FIG. 3 shows a schematic side elevation view of the HOE of FIG. 2, in accordance with a non-limiting implementation of the present specification.

As discussed above, hologram 210 may receive a beam of light and direct at least a portion of the beam into a light guide to form an incoupled beam. The light guide is not visible in FIG. 2, but is shown in FIG. 3. Hologram 215 in turn may receive at least a portion of the incoupled beam and direct the portion of the incoupled beam out of the light guide to form an outcoupled beam. Furthermore, it is contemplated that the sizes and relative positions of holograms 210 and 215 may be different than those shown in FIG. 2.

Medium 205 may also comprise an unrecorded region 220, which is free of holograms 210 and 215. In some examples, region 220 may be free of holograms 210 and 215, and also free of other holograms. It is contemplated that in some examples medium 205 need not comprise unrecorded region 220, and in such examples footprints of holograms 210 and 215 may span or cover substantially the entirety of medium 205.

Turning now to FIG. 3, a schematic side elevation view is shown of HOE 200. FIG. 3 shows medium 205 as being affixed to a light guide 305. Light guide 305 is shown in dashed lines to signify that in some examples medium 205 may act as the light guide, and in other examples HOE 200 need not comprise a light guide. In some examples, light guide 305 may comprise glass, or other materials or structures suitable for conducting light.

Figure 5:
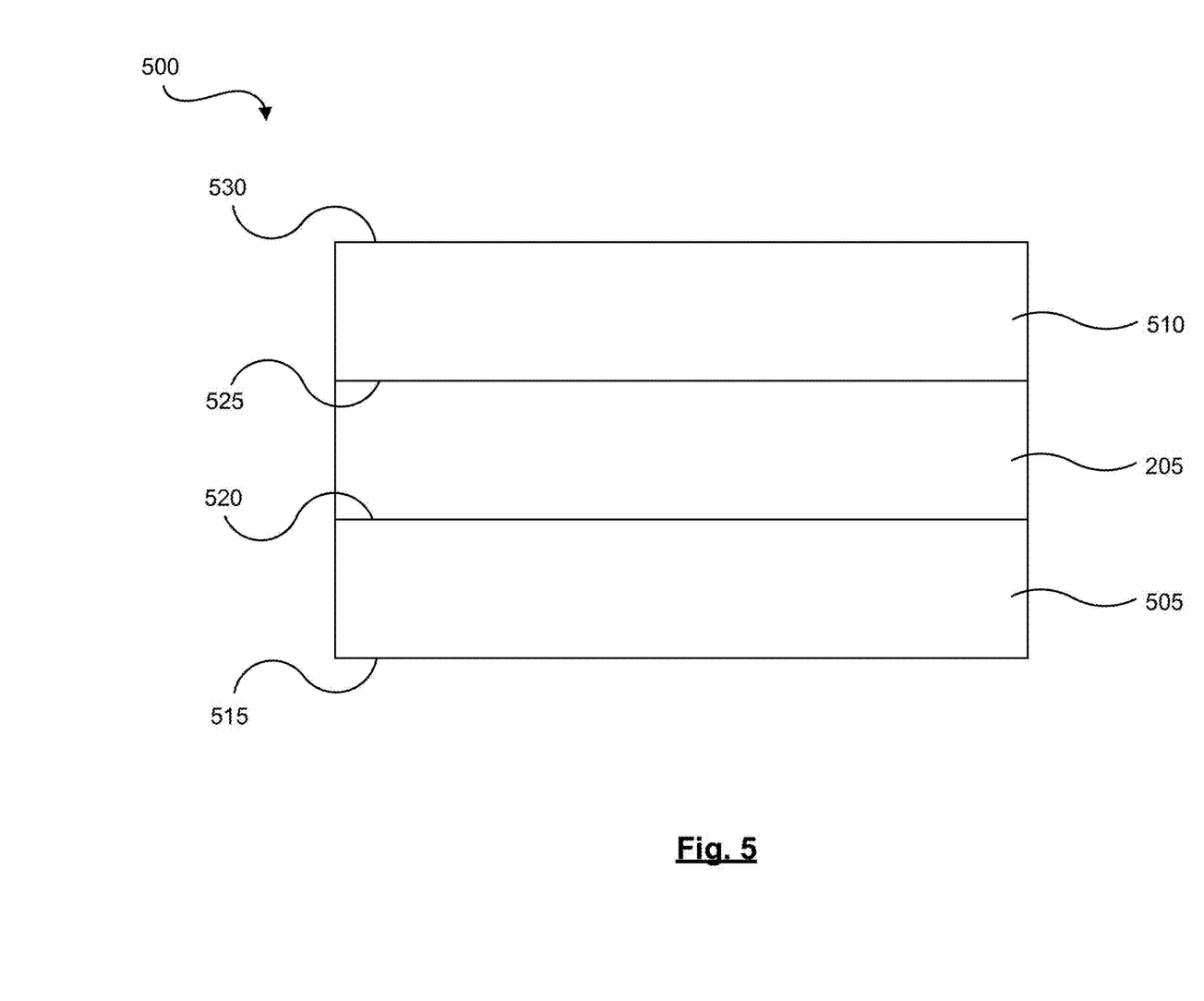
FIG. 5 shows a schematic side elevation view of yet another example HOE, in accordance with a non-limiting implementation of the present specification.

As shown in FIG. 3, medium 205 is affixed on an outer surface of light guide 305. It is contemplated that in some examples the medium may be affixed to the light guide to be at least partially inside the light guide. An example HOE where the medium is partially inside the light guide is shown in FIG. 5, and will be described in greater detail in relation thereto. Furthermore, in some examples, an anti-reflective (AR) coating may be formed between medium 205 and light guide 305. Such an AR coating may reduce losses of the incoupled light by reducing the likelihood that light directed by hologram 210 towards light guide 305 is reflected away instead of entering into light guide 305 through surface 310 to form the incoupled beam. In some examples, the AR coating may be applied on outer surface 310 of light guide 305. It is also contemplated that in some examples, the outer surface of light guide 305 opposite surface 310 may also have an AR coating applied to it.

Returning to FIG. 2, hologram 210 is recorded in a first volume of medium 205 and hologram 215 is recorded in a second volume of medium 205. The dashed rectangles associated with holograms 210 and 215 my demarcate these first and second volumes shown in plan view. As shown in FIG. 2, these first and second volumes are non-overlapping. In some examples, preventing first and second holograms 210 and 215 from overlapping in the volume of medium 205 may reduce the likelihood of optical cross-talk between the functions of hologram 210 and hologram 215.

As shown in FIG. 2, the first volume of medium 205 within which hologram 210 is recorded may be spaced by a gap 225 from the second volume of medium 205 within which hologram 215 is recorded. Gap 225 may comprise a region of medium 205 that does not include holograms 210 and 215. In some examples, gap 225 may be free of other holograms in addition to being free of holograms 210 and 215. While FIG. 2 shows gap 225 separating the respective volumes of holograms 210 and 215, it is contemplated that in some examples the first and second volumes associated with holograms 210 and 215 may be abutting while being non-overlapping. In such abutting arrangements, there may be no gap between the first and second volumes containing holograms 210 and 215.

In some examples, HOE 200 may be used in a full-color display such as those shown in FIGS. 6 and 7, and described in greater detail below. In some examples, the full-color display may use red, green, and blue beams of light to generate full color images. In order to handle the beams of different colors, in some examples, one or more of holograms 210 and 215 may each comprise a wavelength-multiplexed hologram.

In addition, in some examples the beams of light may be incident upon holograms 210 and 215 at different angles based on several parameters including the color of the beams, the spatial position of each pixel within the image being formed by the display, and the like. In order to handle this range of angles, in some examples, one or more of holograms 210 and 215 may each comprise an angle-multiplexed hologram. Furthermore, in some examples, one or more of holograms 210 and 215 may comprise a plurality of constituent holograms. Each constituent hologram may be optimized for interacting with a given range of wavelengths or angles of the light received by the HOE.

Moreover, in some examples, an optical mask may be used to determine the position or alignment of holograms 210 and 215 in relation to each other or in relation to medium 205. For example, openings in the mask may correspond to the positions in medium 205 where a recording light exposes medium 205 to write or record holograms 210 and 215 in medium 205. It is also contemplated that holograms 210 and 215 may be recorded in medium 205 without the use of a mask.

Furthermore, in some examples, once holograms 210 and 215 have been recorded, unrecorded region 220 may be bleached to prevent subsequent changes to the refractive index of the medium in unrecorded region 220. An example of such bleaching may comprise exposing the holographic recording medium to a bleaching light. In some examples, the bleaching light may comprise an incoherent form of the light used to record one or more of holograms 210 and 215 in medium 205. In some examples, this incoherent light may be generated by a Light Emitting Diode (LED).

In examples where medium 205 comprises a photopolymer, such an exposure may deactivate the photo-initiator or unpolymerized polymer precursors to render the photopolymer unsusceptible to further polymerization by the light used to record one or more of holograms 210 and 215 in medium 205. In some examples, a mask may be used to cover already-recorded holograms 210 and 215 while allowing unrecorded region 220 to be exposed to the bleaching light. Moreover, in some examples, already-recorded holograms 210 and 215 may also be exposed to the bleaching light to reduce the likelihood of subsequent change or damage to holograms 210 and 215 caused by light exposure.

In addition, in some examples, the light used to record holograms 210 and 215 in medium 205 may not be able to enter medium 205 from the surrounding air because the relative indexes of refraction of medium 205 and air (i.e. the index of refraction of medium 205 being greater than the index of refraction of air) may make it difficult or impossible for the light beam used to record the holograms to enter medium 205 from air. In such examples, before recording holograms 210 and 215 in medium 205, holographic recording medium 205 may be placed in a surrounding medium having an index of refraction about equal to or larger than a corresponding index of refraction of the holographic recording medium 205. In some examples, this surrounding medium may comprise water, and the like.

Figure 4:
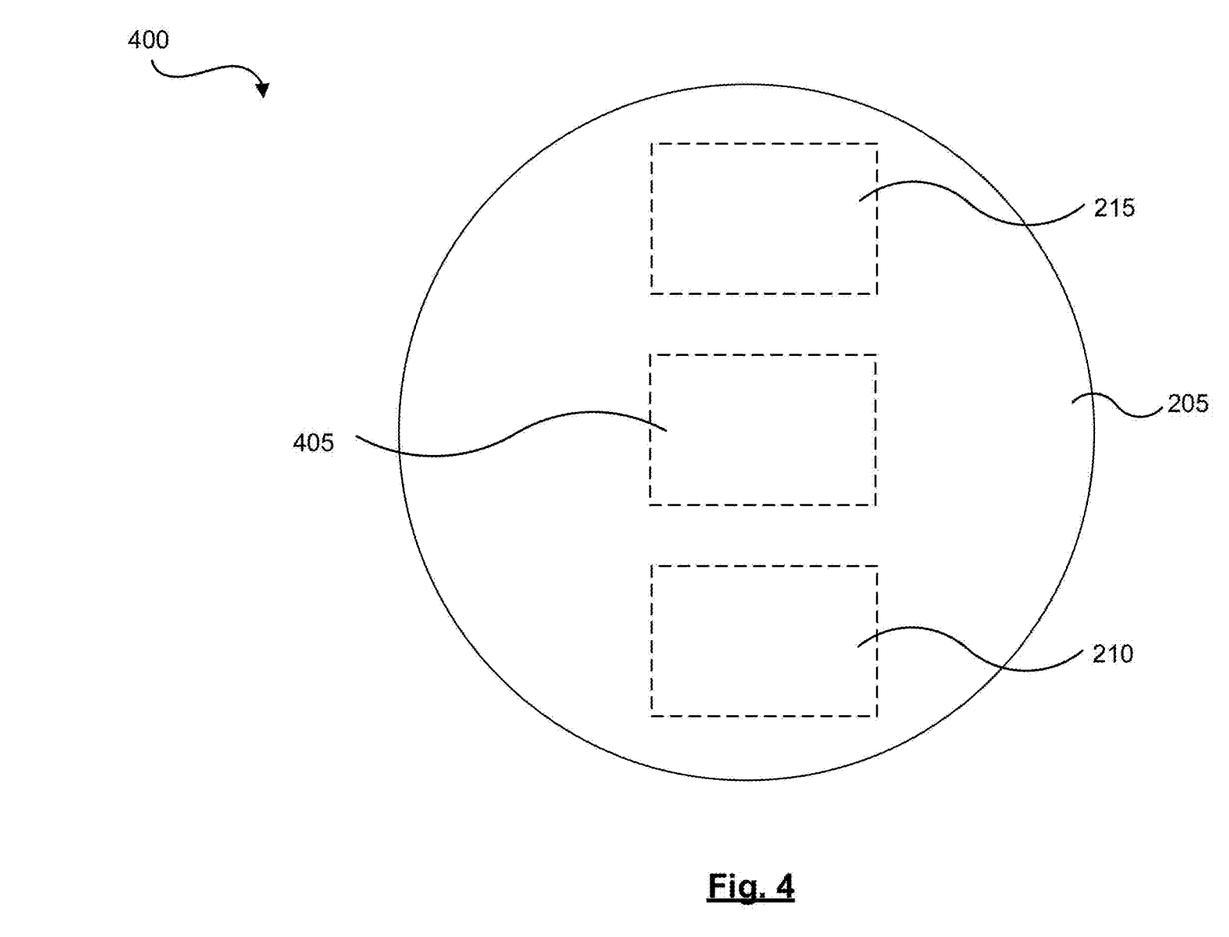
FIG. 4 shows a schematic top plan view of another example HOE, in accordance with a non-limiting implementation of the present specification.

Turning now to FIG. 4, a schematic top plan view is shown of an example HOE 400. HOE 400 is similar to HOE 200, with a difference being that in HOE 400 a third hologram 405 is recorded in medium 205 in addition to holograms 210 and 215. Hologram 405 may be recorded in a manner similar to that described in relation to holograms 210 and 215. In addition, it is contemplated that in some examples the size, shape, and position of hologram 405 relative to holograms 210, 215 and to medium 205 may be different than those shown in FIG. 4. In some examples, hologram 405 may be subject to the variations in size, shape, and position similar to those described herein in relation to holograms 210 and 215.

Furthermore, in some examples, hologram 405 may receive the incoupled beam and split the incoupled beam into a plurality of offspring beams to be received by hologram 215. In such examples, hologram 405 may be disposed in the optical path between hologram 210 acting as an IC and hologram 215 acting as an OC. Such a hologram 405 may act as an exit pupil expander (EPE) allowing HOE 400 to multiply the number of exit pupils viewable by the user of a display incorporating HOE 400. Further, although FIG. 4 shows hologram 405 being positioned in line with holograms 210 and 215, other arrangements are within the scope of the present disclosure. For example, hologram 210 and hologram 215 could be positioned approximately in adjacent directions relative to hologram 405. As two examples, hologram 210 could be positioned approximately upwards of hologram 405, and hologram 215 could be positioned approximately to the left or right of hologram 405. As two other examples, hologram 210 could be positioned approximately to the left or right of hologram 405, and hologram 215 could be positioned approximately downwards of hologram 405. In such examples, hologram 405 may also redirect the plurality of offspring beams to travel towards hologram 215, in a different direction from the direction of travel of the received incoupled beam.

While FIG. 4 shows medium 205 comprising three holograms 210, 215, and 405, it is contemplated that in some examples the medium of the HOE may comprise one or more additional holograms with shapes, sizes, or functionalities similar to or different from those of holograms 210, 215, and 405.

Turning now to FIG. 5, a schematic side elevation view is shown of an example HOE 500. HOE 500 may be similar to HOE 200, with a difference being that in HOE 500 medium 205 is at least partially inside the light guide. As shown in FIG. 5, in HOE 500 medium 205 is sandwiched between portions 505 and 510 of the light guide. In some examples, HOE 500 may comprise an AR coating on one or more surfaces of the light guide. For example, HOE 500 may comprise an AR coating on one or more of surfaces 515 and 520 of portion 505 of the light guide. HOE 500 may also, or instead, comprise an AR coating on one or more of surfaces 525 and 530 of portion 510 of the light guide. Such AR coatings may reduce the likelihood of beams of light being reflected at medium-light guide and light guide-air interfaces where the beams of light are to be transmitted through those interfaces for optimal functioning of HOE 500.

In some examples, AR coatings may be applied to surfaces 515 and 530. In this way, HOE 500 may have AR coatings on external surfaces thereof, to reduce external reflections, without the AR coatings being applied directly to medium 205. Moreover, in some examples, AR coatings may be applied to at least one of surfaces 520 and 525, prior to sandwiching medium 205 therebetween. In this way, AR coatings may be applied at the interfaces between medium 205 and portions 505 and 510, without the AR coatings being applied directly to medium 205.

As described above, some of the reflections at the interfaces of the holographic recording media and the light guide may be reduced by the AR coatings described herein in relation to FIGS. 3 and 5. These reflections may be caused in the first place by the difference in the refractive index of the holographic recording medium and the refractive index of the light guide. Such reflections may also be reduced by selecting or designing the medium to have a refractive index that is about the same as the refractive index of the light guide. The smaller is the difference between the refractive indexes of the medium and the light guide, the smaller will be the portion of the light reflected by or at the interface of the light guide and the medium.

In some examples, the refractive indexes of the medium and the light guide being about the same may comprise the refractive indexes being within 10%, 5%, 2%, or 1% of one another. Moreover, in some examples the medium need not have a constant refractive index throughout its volume. For example, the medium may have a first refractive index in a first region of the medium proximal to the light guide, and a second refractive index in a second region of the medium distal from the light guide. The first region may have a refractive index that is about the same as the refractive index of the light guide. The second region may have a refractive index that is different than the refractive index of the light guide and that of the first region. Moreover, in some examples, the medium may have a gradient refractive index which changes from the first refractive index in the first region to the second refractive index in the second region.

Figure 6:
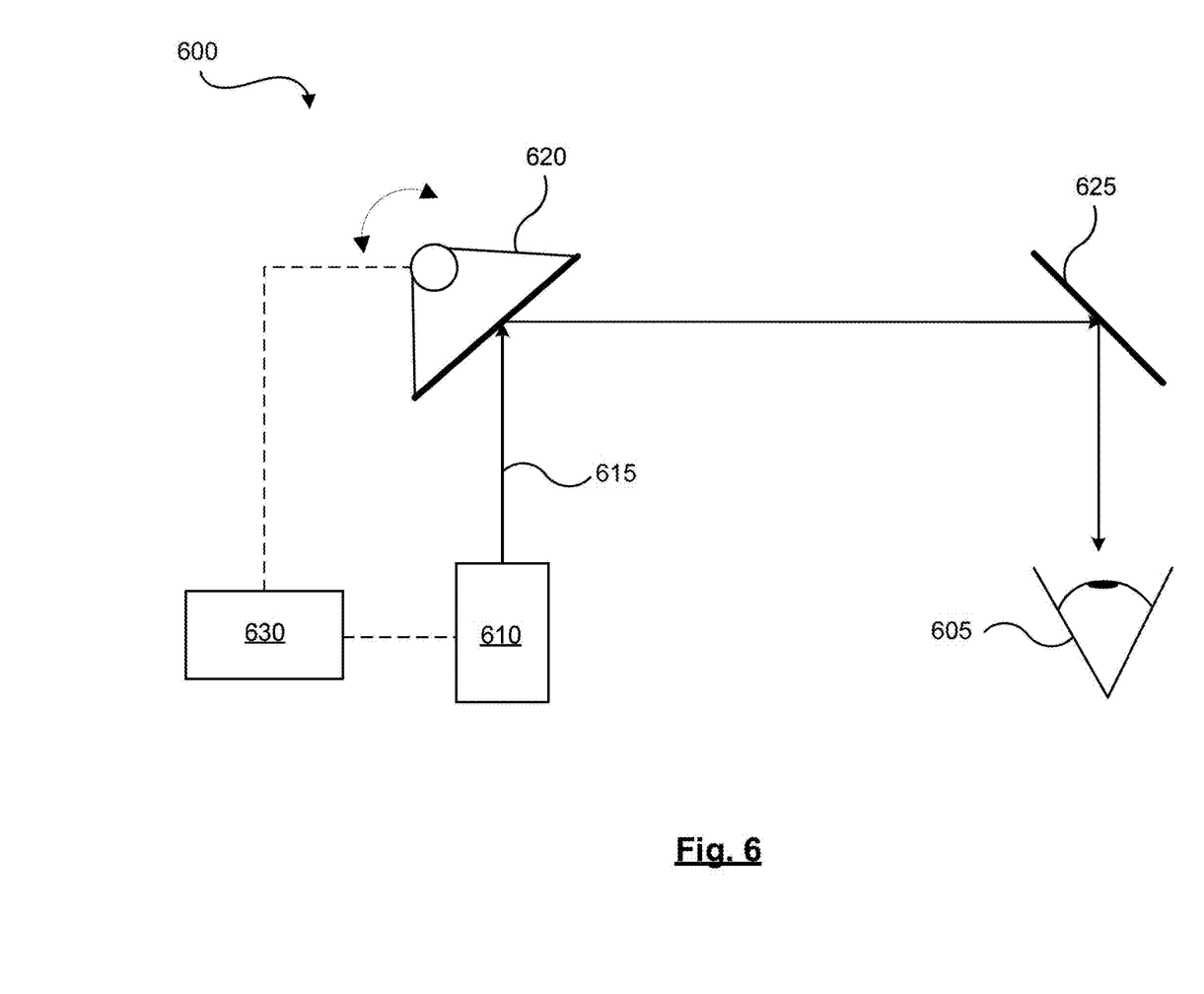
FIG. 6 shows a schematic representation of an example system which may be used to form or project an image, in accordance with a non-limiting implementation of the present specification.

Turning now to FIG. 6, a schematic representation of an example system 600 is shown. System 600 may be used to form or project an image viewable by an eye 605 of a viewer. System 600 may also be referred to or described as an image projection device, a display device, a display system, or a display. The viewer may also be described as a user of system 600. System 600 may comprise a light source 610 to generate an output light 615. Light source 610 may comprise at least one laser, at least one light emitting diode, and the like. System 600 may also comprise a spatial modulator 620 to receive output light 615 from light source 610. In some examples, spatial modulator 620 may comprise a movable reflector, a micro-electro-mechanical system (MEMS), a digital micromirror device (DMD), and the like. In some examples, spatial modulator 620 may be part of a relay optic of system 600.

While FIG. 6 shows system 600 as comprising spatial modulator 620, it is contemplated that in some examples system 600 may comprise a light engine that need not comprise spatial modulator 620 or light source 610. In some examples, such a light engine may comprise a micro-display, or other light sources suitable for forming an image.

Furthermore, system 600 may comprise a display optic 625 to receive output light 615 from spatial modulator 620 and direct the output light towards eye 605 of a viewer. In some examples, display optic 625 may comprise a HOE such as HOE 200, 400, 500, and the other HOEs described herein. Moreover, in some examples system 600 may be a part of or incorporated into a wearable heads-up display (WHUD). Such a heads-up display may have different designs or form factors, such as the form factor of eyeglasses, as is described in greater detail in relation to FIG. 7. In examples where system 600 is in the form factor of glasses, display optic 625 may be on or in a lens of the glasses.

In addition, system 600 comprises a controller 630 in communication with light source 610 and spatial modulator 620. Controller 630 may control light source 610 and spatial modulator 620 to project an image. In some examples, the image to be projected may be a still image, a moving image or video, an interactive image, a graphical user interface, and the like.

In some examples, the controllers described herein such as controller 630 may comprise a processor in communication with a non-transitory processor-readable medium. The processor-readable medium may comprise instructions to cause the processors to control the light source and the spatial modulator to form images viewable by the user of system 600. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 7:
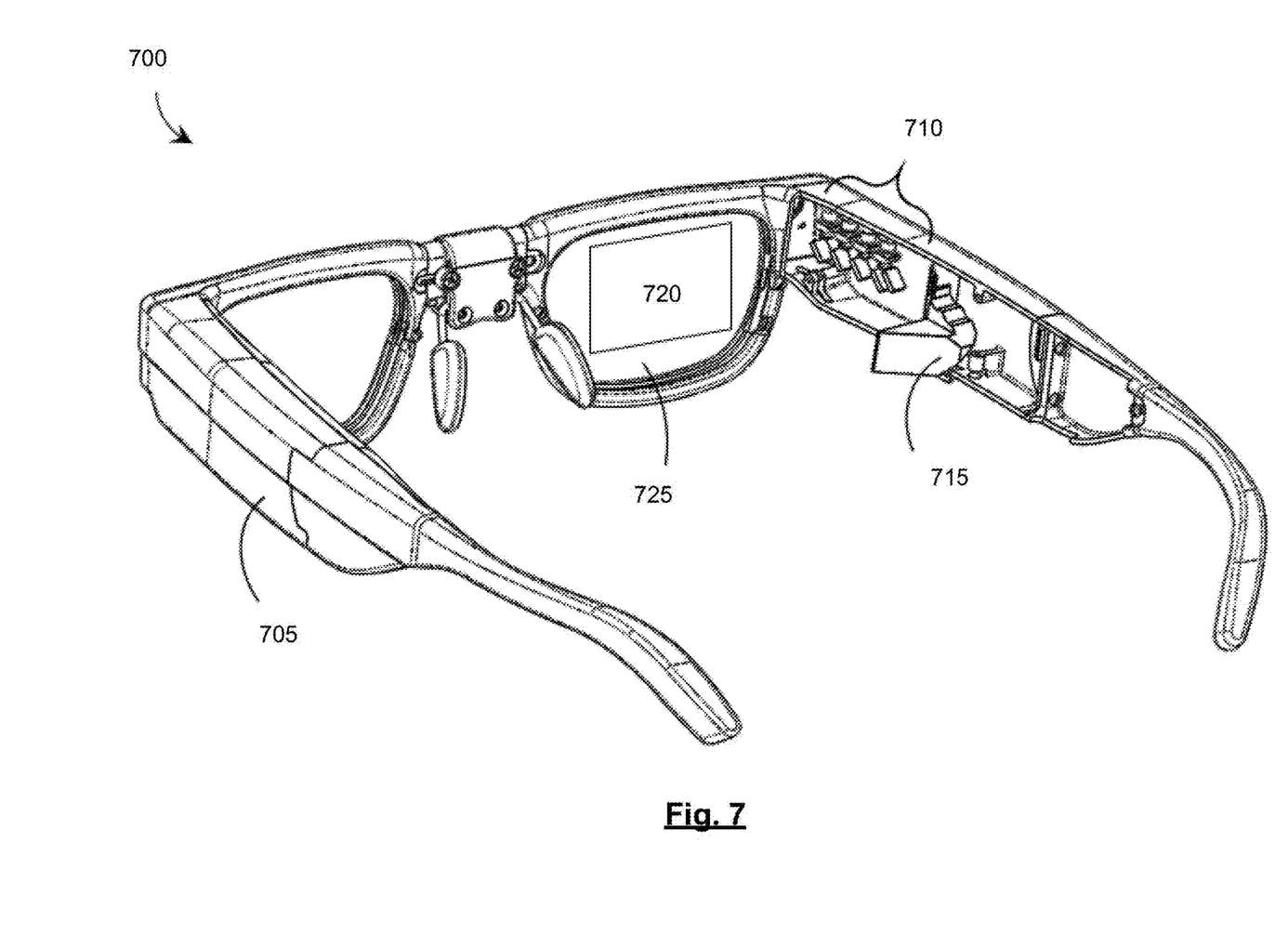
FIG. 7 shows a partial-cutaway perspective view of an example wearable heads-up display, in accordance with a non-limiting implementation of the present specification.

Turning now to FIG. 7, a partial-cutaway perspective view of an example wearable heads-up display (WHUD) 700 is shown. WHUD 700 includes a support structure 705 that in use is worn on the head of a user and has the general form factor and appearance of an eyeglasses (e.g. sunglasses) frame. Eyeglasses or sunglasses may also be generically referred to as "glasses". Support structure 705 may carry components of a system to display an image, such as system 600. For example, the light source module may be received in a space 710 in a side arm of support structure 705.

The spatial modulator of the systems described herein may be received in or be part of component 715 of support structure 705. The spatial modulator in turn may direct the output light onto a display optic 720 carried by a lens 725 of support structure 705. In some examples, display optic 720 may be similar in structure or function to display optic 625. Moreover, in some examples display optic 720 may comprise a HOE such as HOE 200, 400, 500, and the other HOEs described herein.

Figure 8:
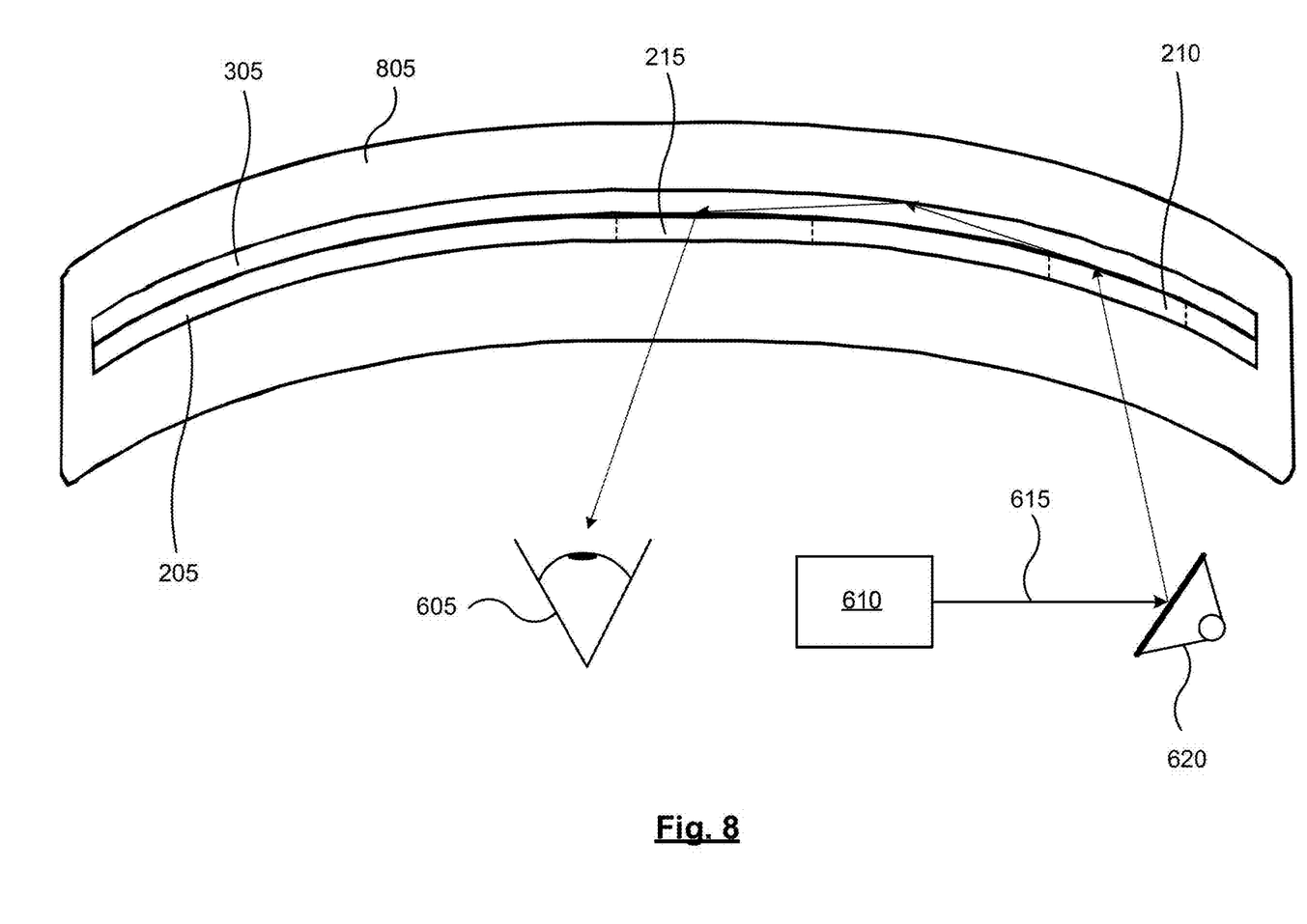
FIG. 8 shows a schematic cross-sectional representation of an example lens of an example wearable heads-up display, in accordance with a non-limiting implementation of the present specification.

Turning now to FIG. 8, a schematic cross-sectional representation is shown of an example lens 805 of an example WHUD. The components in FIG. 8 are not cross-hatched to allow for a clearer illustration of the path of an example ray of light traversing these components. In some examples, lens 805 may be used as lens 725 in WHUD 700. Lens 805 has embedded within it a display optic comprising HOE 200. It is contemplated that in some examples, the display optic may comprise another HOE such as HOE 400, 500, and the other HOEs described herein.

The display optic comprises light guide 305, and holograms 210 and 215 recorded in medium 205 affixed to light guide 305. Hologram 210 may act as an IC to direct at least a portion of output light 615 into light guide 305 to form an incoupled beam. Hologram 215, in turn, may act as an OC to outcouple from light guide 305 a portion of the incoupled beam to form an outcoupled beam propagating towards eye 605 of a viewer. While not shown in FIG. 8, it is contemplated that in some examples medium 205 may comprise a third hologram disposed in the optical path between the IC and OC, which third hologram may act as an EPE.

It is contemplated that in some examples, this display optic may be used as display optic 625 in system 600. In some examples, light guide 305 may guide light within it using total internal reflection. Hologram 210 may receive an incoming beam of light, such as output light 615 generated by light source 610. Hologram 210 may then redirect output light 615 towards light guide 305 at an angle that allows output light 615 to enter light guide 305, and to travel through light guide 305. Total internal reflection may prevent output light 615 from leaking from the walls of light guide 305.

Once output light 615 that is travelling in light guide 305 reaches and becomes incident upon hologram 215, hologram 215 may direct output light 615 out of light guide 305 and towards eye 605 of a user. In some examples, the combination of light guide 305 and medium 205 comprising hologram 210 (acting an IC) and hologram 215 (acting as OC) may be described as a HOE. Such a HOE may be used as, or as a part of, display optic 625 in system 600 or display optic 720 in WHUD 700.

It is contemplated that method 100 and the other methods described herein may be used to make HOEs 200, 400, 500 and the other HOEs described herein. In addition, method 100 and the other methods described herein may also be used to make HOEs other than the HOEs described herein. Moreover, in some examples, HOEs 200, 400, 500 and the other HOEs described herein may be made using method 100 and the other methods described herein. Furthermore, in some examples, HOEs 200, 400, 500 and the other HOEs described herein may be made using methods other than the methods described herein.

Throughout this specification and the appended claims, infinitive verb forms are often used. Examples include, without limitation: "to receive," "to direct," "to form," and the like. Unless the specific context requires otherwise, such infinitive verb forms are used in an open, inclusive sense, that is as "to, at least, receive," "to, at least, direct," "to, at least, form," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations. To the extent that they are not inconsistent with the specific teachings and definitions herein, U.S. Provisional Patent Application No. 62/791,514, U.S. Provisional Patent Application No. 62/943,381, and Provisional Patent Application No. 62/946,705 are each incorporated by reference herein in their entirety.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of making a holographic optical element (HOE), the method comprising:
   recording a first hologram in a contiguous holographic recording medium of the HOE, the first hologram to receive a beam of light and to direct at least a portion of the beam into a light guide to form an incoupled beam;
   recording a second hologram in the contiguous holographic recording medium, the second hologram to receive at least a portion of the incoupled beam and to direct the portion of the incoupled beam out of the light guide to form an outcoupled beam;
   affixing the holographic recording medium to the light guide, and
   forming an anti-reflective coating either between the holographic recording medium and the light guide or on the light guide.

2. The method of claim 1, further comprising:
   recording a third hologram in the holographic recording medium, the third hologram to receive the incoupled beam and split the incoupled beam into a plurality of offspring beams to be received by the second hologram.

3. The method of claim 2, wherein:
   the third hologram is an exit pupil expander; and the recording the third hologram comprises forming the exit pupil expander in the holographic recording medium.

4. The method of claim 1, wherein:
the affixing the holographic recording medium to the light guide comprises affixing the holographic recording medium on the light guide before the recording the first hologram and the second hologram.

5. The method of claim 1, wherein:
the affixing the holographic recording medium to the light guide comprises affixing the holographic recording medium to the light guide after the recording the first hologram and the second hologram.

6. The method of claim 1, wherein:
the affixing the holographic recording medium to the light guide comprises affixing the holographic recording medium on an outer surface of the light guide.

7. The method of claim 1, wherein:
the affixing the holographic recording medium to the light guide comprises affixing the holographic recording medium to be at least partially inside the light guide.

8. The method of claim 1, wherein forming the anti-reflective coating comprises forming the anti-reflective coating between the holographic recording medium and the light guide.

9. The method of claim 1, wherein forming the anti-reflective coating comprises forming the anti-reflective coating on the light guide.

10. The method of claim 1, wherein:
the recording the first hologram comprises recording the first hologram in a first volume of the holographic recording medium; and
the recording the second hologram comprises recording the second hologram in a second volume of the holographic recording medium, the first volume non-overlapping with the second volume.

11. A holographic optical element (HOE) comprising:
a light guide;
a contiguous holographic recording medium comprising:
    a first hologram recorded in the holographic recording medium, the first hologram to receive a beam of light and to direct at least a portion of the beam into the light guide to form an incoupled beam; and
    a second hologram recorded in the holographic recording medium, the second hologram to receive at least a portion of the incoupled beam and to direct the portion of the incoupled beam out of the light guide to form an outcoupled beam, and
an anti-reflective coating either disposed between the holographic recording medium and the light guide or on the light guide.

12. The HOE of claim 11, wherein the holographic recording medium further comprises:
a third hologram recorded in the holographic recording medium, the third hologram to receive the incoupled beam and split the incoupled beam into a plurality of offspring beams to be received by the second hologram.

13. The HOE of claim 11, wherein the holographic recording medium is disposed on an outer surface of the light guide.

14. The HOE of claim 11, wherein the anti-reflective coating is disposed between the holographic recording medium and the light guide.

15. The HOE of claim 11, wherein the anti-reflective coating is disposed on the light guide.

16. The HOE of claim 11, wherein:
the first hologram and the second hologram are recorded in a first volume and a second volume of the holographic recording medium respectively; and
the first volume is non-overlapping with the second volume.

17. A holographic optical element (HOE) comprising:
a light guide;
a contiguous holographic recording medium comprising:
    a first hologram recorded in the holographic recording medium, the first hologram to receive a beam of light and to direct at least a portion of the beam into the light guide to form an incoupled beam; and
    a second hologram recorded in the holographic recording medium, the second hologram to receive at least a portion of the incoupled beam and to direct the portion of the incoupled beam out of the light guide to form an outcoupled beam, and
wherein the holographic recording medium is disposed at least partially in the light guide.

18. A holographic optical element (HOE) comprising:
a light guide;
a contiguous holographic recording medium comprising:
    a first hologram recorded in the holographic recording medium, the first hologram to receive a beam of light and to direct at least a portion of the beam into the light guide to form an incoupled beam; and
    a second hologram recorded in the holographic recording medium, the second hologram to receive at least a portion of the incoupled beam and to direct the portion of the incoupled beam out of the light guide to form an outcoupled beam, and
wherein:
    the holographic recording medium has a first refractive index in a first region of the holographic recording medium and a second refractive index in a second region of the holographic recording medium;
    the first region is proximal to the light guide, and the first refractive index is about the same as a corresponding refractive index of the light guide; and
    the second region is distal from the light guide, the second refractive index being different than the first refractive index and the corresponding refractive index of the light guide.

19. The HOE of claim 18, wherein the holographic recording medium has a gradient refractive index changing from the first refractive index in the first region to the second refractive index in the second region.

* * * * *